United States Patent
Brant (10) Patent No.: US 10,061,760 B2
(45) Date of Patent: Aug. 28, 2018

(54) ADAPTIVE LAYOUT OF CONTENT IN A DIGITAL MAGAZINE

(71) Applicant: Flipboard, Inc., Palo Alto, CA (US)

(72) Inventor: Troy Brant, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 470 days.

(21) Appl. No.: 14/024,465

(22) Filed: Sep. 11, 2013

(65) Prior Publication Data

US 2014/0075289 A1 Mar. 13, 2014
US 2014/0245128 A9 Aug. 28, 2014

Related U.S. Application Data

(60) Provisional application No. 61/700,307, filed on Sep. 12, 2012, provisional application No. 61/752,951, filed on Jan. 15, 2013.

(51) Int. Cl.
*G06F 17/24* (2006.01)
*G06F 17/21* (2006.01)
*G06F 17/22* (2006.01)

(52) U.S. Cl.
CPC .......... *G06F 17/248* (2013.01); *G06F 17/217* (2013.01); *G06F 17/2229* (2013.01)

(58) Field of Classification Search
CPC ...... G06F 17/22; G06F 17/2247; G06F 17/30; G06F 17/30896
USPC ................................ 715/234, 243, 246, 255
See application file for complete search history.

(56) References Cited

U.S. PATENT DOCUMENTS

| | | | |
|---|---|---|---|
| 6,266,059 B1 * | 7/2001 | Matthews, III | G06F 9/4443 715/716 |
| 7,224,892 B2 * | 5/2007 | Yashiro | G11B 27/034 386/230 |
| 7,673,340 B1 | 3/2010 | Cohen et al. | |
| 8,230,075 B1 | 7/2012 | Weskamp et al. | |
| 8,260,915 B1 | 9/2012 | Ashear | |
| 8,825,872 B2 | 9/2014 | Reisman | |
| 8,826,169 B1 | 9/2014 | Yacoub et al. | |

(Continued)

FOREIGN PATENT DOCUMENTS

| | | |
|---|---|---|
| CN | 101127784 A | 2/2008 |
| CN | 101297315 A | 10/2008 |
| WO | WO 2010/132491 A2 | 11/2010 |

OTHER PUBLICATIONS

PCT International Search Report and Written Opinion for PCT/US2013/059302, dated Jan. 28, 2014, 11 Pages.

(Continued)

*Primary Examiner* — Andrew R Dyer
(74) *Attorney, Agent, or Firm* — Fenwick & West LLP (57) ABSTRACT

A digital magazine server generates pages presenting content items to a user in slots of a page template describing a relative positioning of content regions presenting content items. A page template may include a limited number of slots that limits the number of content regions presented to a user. If a number of content items selected for presentation to the user exceeds the limited number of slots in a page template, a plurality of content items are selected and used to generate a combined content item. The combined content item identifies each of the selected plurality of content items and allows a user to view information from various content items used to generate the combined content item.

16 Claims, 3 Drawing Sheets

(56) References Cited

U.S. PATENT DOCUMENTS

| | | |
|---|---|---|
| 9,037,592 B2 | 5/2015 | Walkingshaw et al. |
| 9,092,529 B1 | 7/2015 | Gyongyi et al. |
| 9,348,801 B2* | 5/2016 | Oliveira ................ G06F 17/212 |
| 2002/0073178 A1* | 6/2002 | Jalili ....................... G06Q 30/02 |
| | | 709/219 |
| 2002/0092019 A1* | 7/2002 | Marcus ................ G11B 27/034 |
| | | 725/37 |
| 2003/0004983 A1 | 1/2003 | Cohen |
| 2005/0033657 A1* | 2/2005 | Herrington ....... G06F 17/30058 |
| | | 705/26.7 |
| 2005/0055632 A1 | 3/2005 | Schwartz et al. |
| 2005/0055635 A1 | 3/2005 | Bargeron et al. |
| 2005/0080684 A1 | 4/2005 | Blum |
| 2005/0105134 A1 | 5/2005 | Moneypenny et al. |
| 2005/0240865 A1* | 10/2005 | Atkins ................... G06F 17/217 |
| | | 715/251 |
| 2006/0150092 A1* | 7/2006 | Atkins ................. G06Q 10/043 |
| | | 715/251 |
| 2006/0200758 A1* | 9/2006 | Atkins .................... G06T 11/60 |
| | | 715/209 |
| 2007/0011050 A1 | 1/2007 | Klopf et al. |
| 2007/0220411 A1 | 9/2007 | Hauser |
| 2008/0002964 A1 | 1/2008 | Edwards |
| 2008/0033587 A1* | 2/2008 | Kurita ............... G06F 17/30713 |
| | | 700/100 |
| 2008/0079972 A1 | 4/2008 | Goodwin et al. |
| 2008/0082903 A1 | 4/2008 | McCurdy et al. |
| 2008/0120670 A1 | 5/2008 | Easton et al. |
| 2008/0209343 A1 | 8/2008 | Macadaan et al. |
| 2009/0049374 A1 | 2/2009 | Echenberg |
| 2009/0064003 A1 | 3/2009 | Harris et al. |
| 2009/0249177 A1* | 10/2009 | Yamaji .................... G06T 11/60 |
| | | 715/204 |
| 2009/0254437 A1 | 10/2009 | Lee et al. |
| 2010/0049770 A1 | 2/2010 | Ismalon |
| 2010/0235351 A1 | 9/2010 | Iwasa et al. |
| 2010/0262490 A1 | 10/2010 | Ito et al. |
| 2010/0299642 A1 | 11/2010 | Merrell et al. |
| 2011/0047368 A1 | 2/2011 | Sundaramurthy et al. |
| 2011/0052047 A1 | 3/2011 | Smith |
| 2011/0191321 A1 | 8/2011 | Gade et al. |
| 2011/0222769 A1 | 9/2011 | Galic et al. |
| 2011/0234613 A1 | 9/2011 | Hanson et al. |
| 2011/0246440 A1 | 10/2011 | Kocks et al. |
| 2011/0249903 A1 | 10/2011 | Duga et al. |
| 2011/0265011 A1 | 10/2011 | Taylor |
| 2011/0302064 A1 | 12/2011 | Dunkeld et al. |
| 2012/0066591 A1 | 3/2012 | Hackwell |
| 2012/0079328 A1 | 3/2012 | Sawaguchi |
| 2012/0110678 A1 | 5/2012 | Kumble |
| 2012/0124505 A1 | 5/2012 | St. Jacques |
| 2012/0147163 A1 | 6/2012 | Kaminsky |
| 2012/0192093 A1 | 7/2012 | Migos et al. |
| 2012/0203640 A1 | 8/2012 | Karmarkar et al. |
| 2012/0221555 A1 | 8/2012 | Byrne et al. |
| 2012/0254188 A1 | 10/2012 | Koperski et al. |
| 2012/0297490 A1 | 11/2012 | Barraclough et al. |
| 2012/0304042 A1 | 11/2012 | Pereira et al. |
| 2013/0021377 A1 | 1/2013 | Doll |
| 2013/0024757 A1 | 1/2013 | Doll et al. |
| 2013/0067412 A1* | 3/2013 | Leonard ................ G06F 3/0482 |
| | | 715/835 |
| 2013/0111334 A1 | 5/2013 | Liang et al. |
| 2013/0111395 A1 | 5/2013 | Ying et al. |
| 2013/0145259 A1 | 6/2013 | Kiefer et al. |
| 2013/0332593 A1 | 12/2013 | Patnaikuni et al. |
| 2014/0006406 A1 | 1/2014 | Kafati et al. |
| 2014/0028685 A1 | 1/2014 | Weskamp et al. |
| 2014/0032635 A1 | 1/2014 | Pimmel et al. |
| 2014/0033134 A1 | 1/2014 | Pimmel et al. |
| 2014/0033202 A1 | 1/2014 | Weskamp et al. |
| 2014/0068654 A1 | 3/2014 | Marlow et al. |
| 2014/0074934 A1 | 3/2014 | Van Hoff et al. |
| 2014/0075289 A1 | 3/2014 | Brant |
| 2014/0075296 A1 | 3/2014 | Schaad et al. |
| 2014/0173397 A1 | 6/2014 | Pereira et al. |
| 2015/0019957 A1 | 1/2015 | Ying et al. |
| 2015/0019958 A1 | 1/2015 | Ying et al. |

OTHER PUBLICATIONS

PCT International Search Report and Written Opinion for PCT/US2013/059297, dated Jan. 28, 2014, 15 Pages.

PCT International Search Report and Written Opinion for PCT/US2013/059298, dated Jan. 28, 2014, 15 Pages.

Office Action for Chinese Patent Application No. CN 201380053683.0, dated Aug. 30, 2016, 32 Pages.

Office Action for Chinese Patent Application No. CN 201380053683.0, dated Apr. 27, 2017, 29 Pages.

* cited by examiner

ADAPTIVE LAYOUT OF CONTENT IN A DIGITAL MAGAZINE

CROSS REFERENCE TO RELATED APPLICATIONS

This application claims the benefit of U.S. Provisional Application No. 61/700,307, filed Sep. 12, 2012, and U.S. Provisional Application No. 61/752,951, filed Jan. 15, 2013.

BACKGROUND

This invention relates generally to presentation of content by a digital magazine and more particularly to combining content items for more efficient display in a digital magazine.

Publishers provide an increasing amount of content items to users through digital distribution channels, and users access these content items through various client devices. However, different client devices have different capabilities for displaying content items. For example, different client devices have different display areas, different display resolutions, different content download speeds, and different processing capabilities. These variations in display capabilities make it difficult for publishers to present content items on different client devices in a consistent manner.

For example, if a publisher of a digital magazine seeks to display a table of contents for a digital magazine or for a section of the digital magazine, the number of content items displayed by the table of contents may vary based on the client device. This variation in displayed content items may be based on variations in display resolutions or display areas of different client devices. The wide variety of client devices used to present content items makes use of device-specific display algorithms impractical. Some conventional techniques for displaying a table of contents shrink the display size of each content item to display all content items in a display area or exclude some content items from display. However, these techniques limit the ability of a user to view a comprehensive listing of the content items in a digital magazine or a section of the digital magazine.

SUMMARY

A digital magazine is a personalized, customizable application for displaying content items to a user of a client device (such as a mobile communication device, tablet, computer, and any other suitable computing system). Content items presented by the digital magazine are organized into sections, which may be further divided into subsections. When a user accesses a digital magazine, sections of content items selected for the user are based on the user's interests and preferences and presented to the user via one or more pages that include content items.

To present content items to a user, the digital magazine selects a page template that includes a one or more slots specifying positions of a display in which content items are presented. The selected page template may include a limit on a number of slots for presenting content items. To present content items to the user via the selected page template, a number of content items to be presented to the user is compared to the limit on the number of slots of the selected page template. If the number of content items exceeds the limit on the number of slots of the selected page template, a plurality of content items are selected and used to generate a combined content item that includes information identifying each of the selected content items. This allows the user to identify the content items that were combined via the combined content item, while reducing the display area used to present content items to the user. Various criteria may be used to select the content items used to generate the combined content item, or a user may manually identify content items for generating the combined content items. In one embodiment, content items are combined until a total number of combined content items and uncombined content items is less than or equal to the limit on the number of slots in the selected page template. Hence, presenting the combined content item allows a single content region to include information from various selected content items.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., status updates or other content posted on a social networking system), advertisements, and any other types of content capable of display within the context of a digital magazine.

System Architecture

Figure 1:
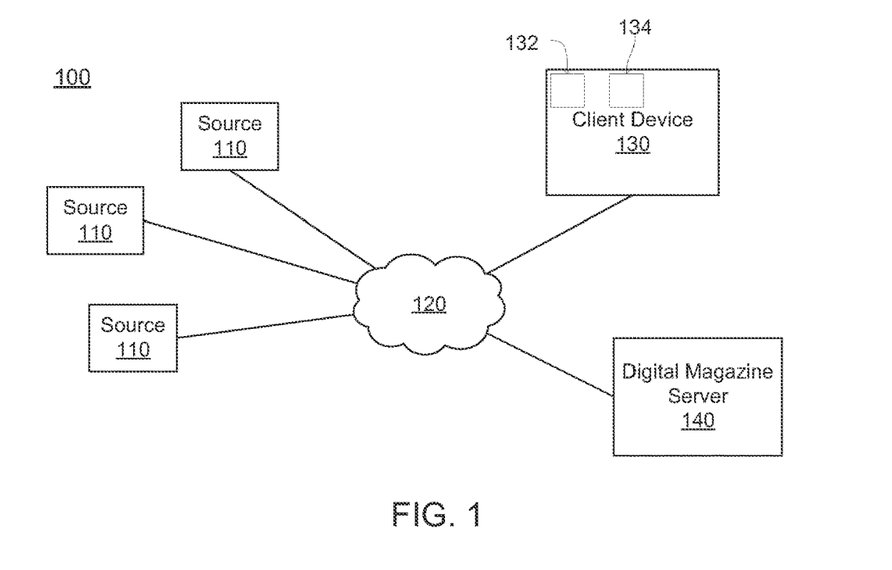
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine servers 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML), or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

In one embodiment, the digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
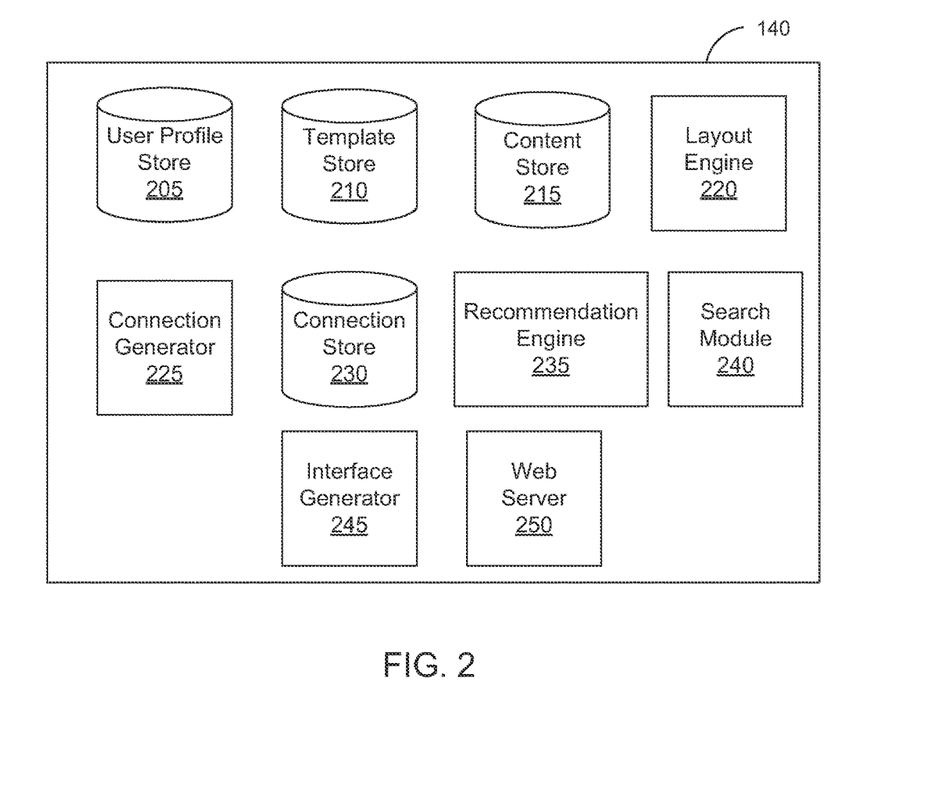
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

In some embodiments, information in a user profile is used to select content items presented to a user associated with the user profile. For example, if a page template includes a limited number of slots for displaying content items, information in a user profile may be used to select the content items for presentation in the slots of the page template or to identify content items that are combined to be presented as a combined content item in a single slot. Examples of relevant user profile information for selecting content items include demographic information, user-specified interests or preferences, and user location.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that represent various types of content. For example, the content store 215 stores content items received from one or more sources 115 within a threshold time of a current time. Examples of content items stored by the content store 215 include page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. In some embodiments, a score of a candidate page template is based in part on the likely user interest in various content items. For example, a measure of a user's interest in one or more content items is determined based on prior user interactions with content items having a threshold similarity to a content item or interactions between users with a threshold social proximity to the user to be presented with the content item. The measure of the user's interest in various content items may be a characteristic used when selecting a candidate page template or when selecting content items for presentation to the user. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

One or more page templates from the template store 210 may include a limited number of slots for presenting content items. If the number of content items to be presented to a user exceeds the a limit on a number of slots presented using a selected page template, the layout engine 220 selects a plurality of content items from the content items to be presented and generates a combined content item that identifies each of the selected plurality of content items. The content items used to generate the combined content item may be manually selected by user input, selected based at least in part on user preferences, selected based on characteristics of various content items (e.g., number of additional content items associated with a content item, a measure of user interest in various content items, connection between the user and various content items, similarity between content items and content items with which the user previously interacted, etc.).

The combined content item is then presented to the user in a single slot of the selected page template rather than each of the plurality of selected content item. For example, the combined content item includes data identifying each of the selected content items used to generate the combined content item. By interacting with the combined content item when it is displayed as a content region of a page, data from one or both of the content items may be presented to the user.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion of the search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content using technologies such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, WINDOWS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, combining content items to reduce the number of content items displayed to a user may be performed by the layout engine 220 of the digital magazine server 140 or by an application associated with the digital magazine server 140 and executing on the client device 130.

Page Templates

Figure 3:
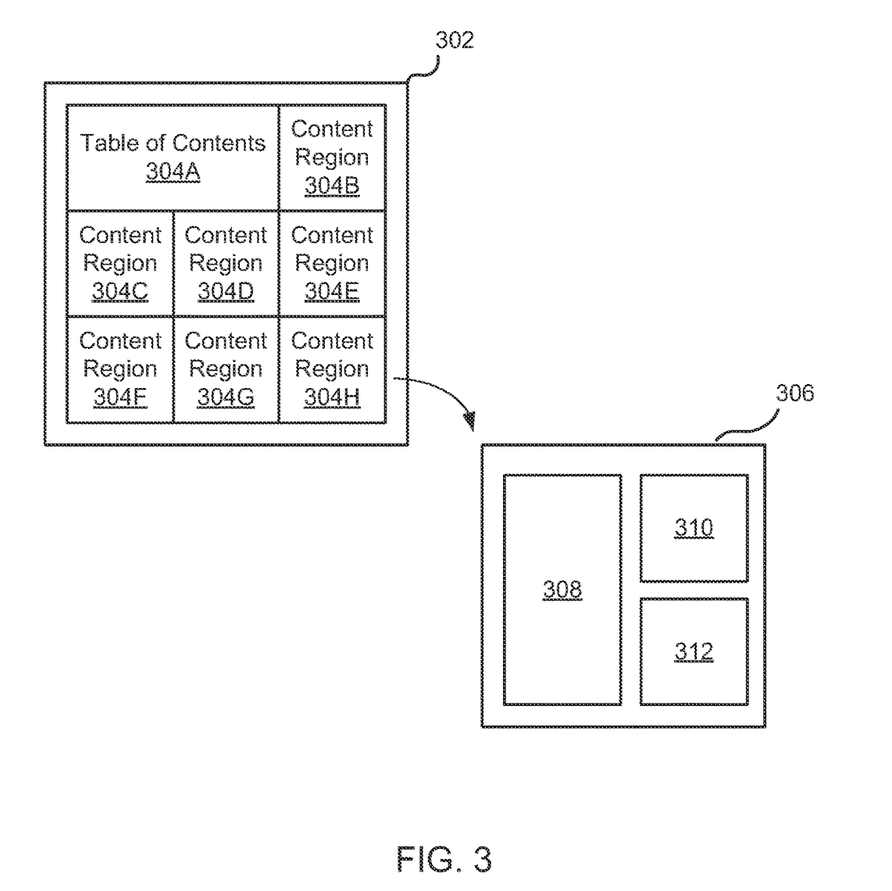
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 3, in some embodiments, one or more slots in a page template are reserved for presentation of content items having specific characteristics or for presentation of a specific type of content item. In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot. In some embodiments, a page template 302 has a limit on a number of content regions presented by a page generated based on the template. For example, the page template 302 limits the number of content items displayed to the number of slots included on the page template 302.

A content region 304 may present image data, text, data, a combination of image and text data, or any other information retrieved from a corresponding content item. For example, in FIG. 3, the content region 304A represents a table of contents header, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of a social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Content Region Limit and Merging

Figure 4:
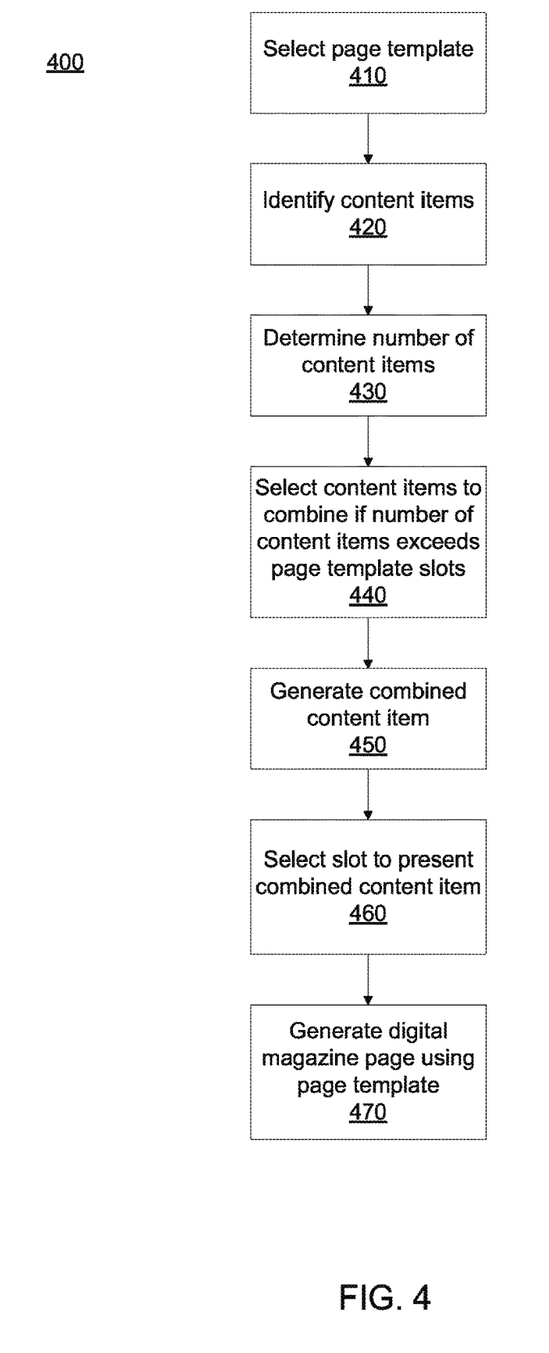
FIG. 4 is a flowchart of a method for combining content regions presented in a digital magazine, in accordance with an embodiment of the invention.

FIG. 4 illustrates a flowchart of method 400 for limiting a number of content regions presented in a page of a digital magazine. In other embodiments, the method 400 may include different and/or additional steps than those shown in FIG. 4. The functionality described in conjunction with FIG. 4 may be provided by the layout engine 220, in one embodiment, or may be provided by any other suitable component or components.

In one embodiment, a page template is selected 410 from page templates in the template store 210. As described above, the selected page template has one or more slots specifying locations in which content items are displayed in a page of a digital magazine. Additionally, in the example of FIG. 4, the selected page template has a limit on the number of slots for presenting content items. Selection of the page template may depend on various factors, such as a type of client device 130 on which the content items are to be presented, or the size and/or resolution of a display device 132 associated with the client device 130.

One or more content items are identified 420 to present to a user of the digital magazine server 140 in positions of a display area specified by slots in the selected page template. For example, the recommendation engine 235 of the digital magazine server 140 identifies 420 content items, or a combination of the layout engine 220 and the interface generator 245 identify 420 content items. The number of content items identified 420 for presentation is determined 430 by the layout engine 220. Alternatively, an application associated with the digital magazine server 140 executing on a client device 130 receives the one or more identified content items and determines 430 the number of content items for presentation.

If the determined number of content items identified 420 for presentation exceeds the limit on the number of slots in the selected page template, a plurality of content items are selected 440. For example a number of content items are selected 440 so the total number of selected content items and unselected content items is less than or equal to the limit on the number of slots in the selected page template. Different criteria may be used to select 440 content items to combine. Examples of criteria for selecting 440 content items to combine include a measure of similarity between various content items, a user's interest score for various content items, a number of content items selected 440 for presentation, or any combination thereof.

In one embodiment, a user's interest score for a content item is determined based on preferences and/or interests included in a user profile associated with the user, interests of the user inferred from the user's previous interactions with content items, or interests of the user inferred from the user's connections to other users via the digital magazine server 140 or via one or more social networking systems; additional demographic information (e.g., location, language, age, education, or employment history, etc.) may also be used to infer interests of the user. For example, a base interest score is initially computed from global information maintained by the digital magazine server 140; in one embodiment, information such as total interactions associated with a content item and/or similar content items, other users' interactions with a content item and/or similar content items, and promotional considerations (i.e., revenue resulting from display of a content item) are used to generate a base interest score for a content item. Based on user-specific information, the base interest score is modified to determine an interest score representing a user's likely interest in the content item. Information from the user profile store 205 and connection store 230 may be used to determine a user's interest score for a content item. For example, if user profile information for a user indicates that a content item is likely of interest to a user, the content item is less likely to be selected 440 for combination with another content item and more likely to be displayed. As another example, if a location associated with a content item is within a threshold distance of a location associated with a user, the content item is less likely to be selected 440 for combination with another content item.

Alternatively, the plurality of content items are selected 440 based on a similarity score between content items determined from information in the connection store 230 or from analyzing descriptions associated with various content items. The similarity score provides a measure of the similarity of the content included in various content items. For example, if multiple users associate a similar description with a pair of content items, then the pair of content items are more likely to be selected 440 for combination. Other examples of factors used to determine a similarity score include location associated with content items, descriptions or comments associated with content items, and information included in content items.

A combined content item is generated 450 from the selected content items. The combined content item includes information identifying each of the selected content items from which the combined content item was generated 450. While FIG. 4 describes generation of a combined content item, in other embodiments the selected content items may be partitioned into various groups of content items with a different combined content item generated 450 for each group of content items; alternatively, a user may specify generation of a number of combined content items, which are generated from the selected content item. The information in the combined content item identifying each selected content item may include text, images, and/or videos. Including information identifying each of the selected content items allows the user to more easily identify different content items used to generate 450 the combined content item.

A slot from the selected page template is selected 460 for presentation of the generated combined content item. Selection of a slot for presentation of a content item is further described above in conjunction with FIG. 2. The combined content item is presented rather than individually presenting the selected content items that were used to generate 450 the combined content item. Rather, the information identifying each of the selected content items included in the combined content item presents information about these content items to the user. A page of the digital magazine is generated 470 that presents the combined content item. Additionally, the page of the digital magazine may also present one or more unselected content items in positions determined by the slots included in the selected page template. In one embodiment where all of the identified content items are selected 440 for combination, a single combined content item is displayed in the generated page.

In one embodiment, selection of content items to combine, generation of a combined content item, and selection of a page template slot to present the combined content item are repeated until a total number of combined and uncombined content items does not exceed the limit on the number of slots of the selected page template. In an alternative embodiment, content items are selected 440 and one or more content items are generated 450 parallel until a total number of combined and uncombined content items is less than or equal to the limit on the number of slots of the selected page template. Additional embodiments may modify the ordering and/or the repetition of steps of the method 400.

In an alternate embodiment, one or more identified 420 content items may be removed from consideration for presentation in the selected page template before, during, or after combination of content items. For example, methods in addition to combining content items may be used to limit the number of content regions to less than or equal to the number of slots in the selected page template. As an example, one or more of the identified content items may not be presented in the generated page. In an alternate embodiment, the selected page template may be modified to include additional slots to increase the limit on the number of slots in the selected page template. For example, the size of one or more slots in the selected page template is reduced to include additional slots in the selected page template. A slot to reduce in size may be identified based on characteristics of a content item to be presented using the slot based on similar information as described above regarding selection of content items for combination.

In some embodiments, the user may use an input device 134 to manually choose content items presented to the user by a client device 130 for combination. For example, a page template is selected and one or more content items for presentation to the user are identified, as described above. A page of the digital magazine is generated that includes the identified one or more content items presented in positions of a display device 132 of the client device 130 determined by slots in the selected page template. The user selects a plurality of the content items presented by the page, and the selected content items are identified to the digital magazine server 140 or to an application associated with the digital magazine server 140 executing on the client device 130. For example, the user selects content items by accessing content regions presenting different content items. As described above, a combined content item is generated from information in each of the selected content items; the combined content item includes information identifying each of the selected content items, allowing the user to easily identify information from the selected content items. A modified page of the digital magazine that includes the combined content item rather than each of the selected content items is generated and presented to the user via a client device. As described above, the modified page may present the combined content item in a slot of the selected page template as well as content items not used to generate the combined content item in various slots of the selected page template.

In some circumstances, such as when a user generates a combined content item by manually selecting content items, the number of slots for presenting content items may exceed the number of content items to be presented. Rather than present empty slots to the user, one or more content regions in which content items are presented may be increased in size by combining slots associated with the content regions into a combined slot. For example, multiple content regions are combined to increase the size of a content region by combining the slots associated with different content regions. The content region chosen for enlargement may be selected according to metrics similar to those used to select 440 content items for combination and/or adjacency of display space associated with a content region displaying a content item to empty display space associated with a content region corresponding to a slot that is not associated with a content item. For example, a content region displaying a content item may be displayed adjacent to one or more content regions corresponding to slots that are not associated with a content item, so nothing is displayed in the one or more content regions. For example, an instruction is communicated from the digital magazine server 140 to a client device 110 to present a content item associated with a slot in a position determined by a combination of slots to increase the size of the content region used to display the content item.

When the content region is enlarged, it is combined with one or more of the adjacent content regions corresponding to slots that are not associated with a content item, so the display that was not previously displaying content is used to display the content item, or content items, associated with the enlarged content region. In another example, a content item displayed in a content region has a high interest score because at least a threshold number of other users connected to the user interacted with the content item, so the content region displaying the content item is selected for enlargement. In an alternate embodiment, content items are selected 440 to be combined so the total number of combined and uncombined content items is less than the number of slots in the selected page template, and content regions are selected for enlargement to occupy display area corresponding to slots that are not associated with a content item. Additionally, if the user identifies additional content items to be presented, an enlarged content region is modified back to its original size, allowing the additional content items to be displayed based on sizes associated with one or more slots in the page template used to display the content items.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a digital magazine table of contents, the method comprising:
    selecting a page template including a plurality of slots and including a limit on a number of slots, each slot configured to present one or more sections of the digital magazine;
    identifying sections for presentation to a user of a digital magazine server in positions of a display area of a client device specified by the slots in the selected page template, each section corresponding to a set of content items having a common characteristic;
    determining that a number of sections identified for presentation to the user exceeds the limit on the number of slots of the selected page template;
    responsive to determining that the number of the sections identified for presentation exceeds the limit on the number of slots of the selected page template,
        determining an interest score of the user for each content item in each identified section, the interest score for a content item determined by:
            determining a base interest score for the content item based on a number of interactions with the content item by other users of the digital magazine server, determining that the location associated with the content item is within a threshold distance of the location associated with the user, and responsive to determining that the location associated with the content item is within the threshold distance of the location associated with the user, modifying the base interest score based on the location associated with the content item and the location associated with the user by increasing the base interest score for the content item; and selecting two or more identified sections for combination into a combined section, the two or more identified sections have content items each having an interest score below a threshold value;

generating a combined section from the selected two or more identified sections wherein each of the selected sections are individually identifiable from information included in the combined section;

selecting a slot from the selected page template for presenting the combined section; and generating a digital magazine table of contents presenting the combined section instead of the selected sections that were used to generate the combined section in the selected slot from the selected page template as well as presenting one or more unselected sections in positions determined by the slots included in the selected page template, wherein content items from each of the selected sections of the combined section are individually identifiable from information included in the generated digital magazine table of contents presented to the user.

2. The method of claim 1, wherein the interest score for the content item is further determined based on one or more characteristics selected from a group consisting of: associated demographics, promotional considerations, content labels, and any combination thereof.

3. The method of claim 1, wherein selecting the two or more of the identified sections comprises:

determining a measure of similarity between content items in various groups of content items corresponding to subsets of the sections identified for presentation to the user based at least in part on similarity between information associated with each content item in a group of content items; and selecting the two or more sections responsive to content items in the selected sections having at least a threshold measure of similarity.

4. The method of claim 3, wherein the measure of similarity between content items in a group of content items is based at least in part on interactions by one or more users of the digital magazine server with one or more content items in the group.

5. The method of claim 1, wherein selecting the two or more of the identified sections comprises selecting the two or more identified sections so that a total of one or more combined sections and unselected sections does not exceed the limit on the number of slots in the selected page template.

6. The method of claim 1, further comprising:

receiving a selection of a plurality of sections from the user;

generating another combined section wherein each of the selected plurality of sections are individually identifiable from information included in the combined section; and generating a modified table of contents presenting the other combined section instead of each of the selected plurality of sections in another slot from the selected page template.

7. The method of claim 6, wherein generating the modified table of contents comprises:

responsive to the modified table of contents including a number of sections less than the limit on the number of slots in the selected page template, generating a combined slot including a slot associated with a position in which a sections is displayed and one or more slots adjacent to the slot and associated with one or more positions in which no content item is displayed; and sending an instruction to present the other combined sections in a position specified by the combined slot.

8. The method of claim 6, wherein the modified table of contents further presents one or more additional sections in positions corresponding to additional slots in the selected page template.

9. A computer program product comprising a non-transitory computer-readable storage medium containing computer program code executable to a cause a processor to perform steps comprising:

selecting a page template including a plurality of slots and including a limit on a number of slots, each slot configured to present one or more sections of the digital magazine;

identifying sections for presentation to a user of a digital magazine server in positions of a display area of a client device specified by the slots in the selected page template, each section corresponding to a set of content items having a common characteristic;

determining that a number of sections identified for presentation to the user exceeds the limit on the number of slots of the selected page template;

responsive to determining that the number of the sections identified for presentation exceeds the limit on the number of slots of the selected page template, determining an interest score of the user for each content item in each identified section, the interest score for a content item determined by:

determining a base interest score for the content item based on a number of interactions with the content item by other users of the digital magazine server, determining that the location associated with the content item is within a threshold distance of the location associated with the user, and responsive to determining that the location associated with the content item is within the threshold distance of the location associated with the user, modifying the base interest score based on a location associated with the content item and a location associated with the user by increasing the base interest score for the content item; and selecting two or more identified sections for combination into a combined section, the two or more identified sections have content items each having an interest score below a threshold value;

generating a combined section from the selected two or more identified sections wherein each of the selected sections are individually identifiable from information included in the combined section;

selecting a slot from the selected page template for presenting the combined section; and generating a digital magazine table of contents presenting the combined section instead of the selected sections that were used to generate the combined section in the selected slot from the selected page template as well as presenting one or more unselected sections in positions determined by the slots included in the selected page template, wherein content items from each of the selected sections of the combined section are individually identifiable from information included in the generated digital magazine table of contents.

10. The computer program product of claim 9, wherein the interest score for the content item is further determined based on one or more characteristics selected from a group consisting of: associated demographics, promotional considerations, content labels, and any combination thereof.

11. The computer program product of claim 9, wherein selecting the two or more of the identified sections comprises:
 determining a measure of similarity between content items in various groups of content items corresponding to subsets of the sections identified for presentation to the user based at least in part on similarity between information associated with each content item in a group of content items; and
 selecting the two or more sections responsive to content items in the selected sections having at least a threshold measure of similarity.

12. The computer program product of claim 11, wherein the measure of similarity between content items in a group of content items is based at least in part on interactions by one or more users of the digital magazine server with one or more content items in the group.

13. The method of claim 11, wherein the information associated with each content item in a group of content items comprises one or more selected from a group consisting of: a location associated with a content item, a description associated with the content item, information included in the content item, and any combination thereof.

14. The computer program product of claim 9, wherein the steps further comprise:
 receiving a selection of a plurality of sections from the user;
 generating another combined section wherein each of the selected plurality of sections are individually identifiable from information included in the combined section; and
 generating a modified table of contents presenting the other combined section instead of each of the selected plurality of sections in another slot from the selected page template.

15. The computer program product of claim 14, wherein generating the modified table of contents comprises:
 responsive to the modified table of contents including a number of sections less than the limit on the number of slots in the selected page template, generating a combined slot including a slot associated with a position in which a section is displayed and one or more slots adjacent to the slot and associated with one or more positions in which no content item is displayed; and
 sending an instruction to present the other combined section in a position specified by the combined slot.

16. The computer program product of claim 9, wherein selecting the two or more of the identified sections comprises selecting the two or more identified sections so that a total of one or more combined sections and unselected sections does not exceed the limit on the number of slots in the selected page template.

* * * * *

UNITED STATES PATENT AND TRADEMARK OFFICE
CERTIFICATE OF CORRECTION

PATENT NO. : 10,061,760 B2  
APPLICATION NO. : 14/024465  
DATED : August 28, 2018  
INVENTOR(S) : Troy David Brant Page 1 of 1

It is certified that error appears in the above-identified patent and that said Letters Patent is hereby corrected as shown below:

In the Claims

Column 19, Line 30, Claim 13, delete "method" and insert --computer program product--

Signed and Sealed this
Third Day of December, 2019

Andrei Iancu
*Director of the United States Patent and Trademark Office*